United States Patent [19]

Popplewell et al.

[11] 3,861,884

[45] Jan. 21, 1975

[54] COMPOSITE METAL ARTICLE

[75] Inventors: James M. Popplewell, Guilford, Conn.; Sheldon H. Butt, Godfrey, Ill.

[73] Assignee: Olin Corporation, New Haven, Conn.

[22] Filed: Dec. 13, 1973

[21] Appl. No.: 424,569

[52] U.S. Cl. .................................................. 29/199
[51] Int. Cl. ............................................ B32b 15/20
[58] Field of Search ..................................... 29/199

[56] References Cited
UNITED STATES PATENTS

| | | | |
|---|---|---|---|
| 974,296 | 11/1910 | Remane | 29/199 |
| 2,154,834 | 4/1939 | Lamatter | 29/199 |
| 2,472,296 | 6/1949 | Hartnell | 29/199 |
| 3,202,530 | 8/1965 | Wolfe | 29/199 |
| 3,395,443 | 8/1968 | Polinko | 29/199 |
| 3,407,050 | 10/1968 | Trapp | 29/199 |

*Primary Examiner*—L. Dewayne Rutledge
*Assistant Examiner*—Arthur J. Steiner
*Attorney, Agent, or Firm*—Robert H. Bachman

[57] ABSTRACT

A composite having a first component of nickel or a nickel alloy and a second component of a copper alloy containing a material selected from the group consisting of iron in an amount from 0.5 to 5.0%, cobalt from 0.3 to 2.0% and mixtures thereof, balance essentially copper. The composite is particularly useful in the preparation of composite strip having good compatibility with aluminum, especially as an electrical terminal having high strength and corrosion resistance.

9 Claims, 1 Drawing Figure

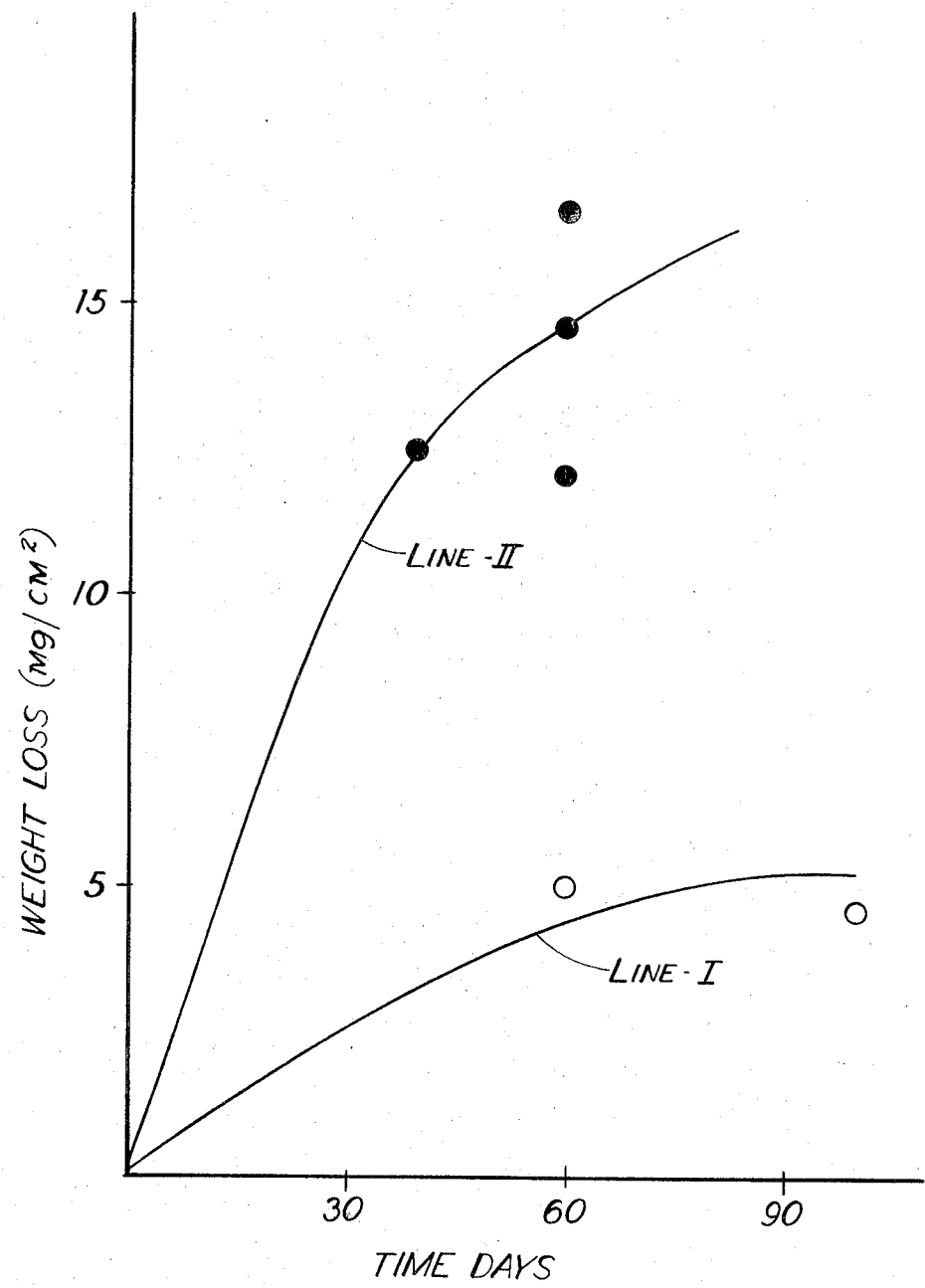

COMPOSITE METAL ARTICLE

BACKGROUND OF THE INVENTION

Heretofore electrical terminal systems and wire have been generally made from copper or copper base alloys due to their high electrical conductivity and corrosion resistance. In addition, many electrical terminal systems require reasonable strength in order to maintain sufficient contact pressure after assembly to minimize contact resistance.

The advent of lower cost conductor wire, such as electrical conductivity grade aluminum, has created a severe problem due to the inherent galvanic incompatibility between copper terminals and aluminum. Even under mildly corrosive conditions aluminum corrodes quite rapidly in contact with copper. This represents a significant problem since in a terminal assembly a loss of electrical contact would result, or an actual mechanical failure of the aluminum wire would result.

Accordingly, there is a need for an electrical terminal material having high electrical conductivity, strength and corrosion resistance and which is more galvanically compatible with aluminum.

It is, therefore, a principal object of the present invention to provide an improved composite having high strength, high electrical conductivity and good corrosion resistance.

It is further object of the present invention to provide a composite as aforesaid which is suitable for a variety of uses, especially as composite strip or wire having good galvanic compatibility with aluminum.

A still further object of the present invention is to provide an improved electrical terminal utilizing the composite of the present invention and having high strength, good corrosion resistance and good galvanic compatibility when coupled to either an aluminum or copper wire.

Other objects and advantages of the present invention will appear from the ensuing specification.

SUMMARY OF THE INVENTION

In accordance with the present invention it has now been found that the foregoing objects and advantages, as well as others, may be readily achieved. The composite of the present invention includes a first component of nickel or a nickel base alloy and a second component of a copper alloy containing either iron from 0.5 to 5.0% or cobalt from 0.3 to 2.0% or mixtures thereof, balance essentially copper. The composite of the present invention is particularly useful in the formation of composite strip or wire having good galvanic compatibility with aluminum.

The present invention also contemplates an improved electrical terminal having high strength, good corrosion resistance and good galvanic compatibility. The terminal of the present invention includes the composite strip of the present invention coupled to either an aluminum or copper wire.

DESCRIPTION OF DRAWING

The Drawing is a graph wherein weight loss of electrical conductivity grade aluminum wire in a given terminal assembly is plotted as a function of time. Two terminal assemblies are shown, one of which being electrical conductivity grade aluminum wire being coupled to a composite of the present invention (line I) and the other being electrical conductivity grade aluminum wire coupled to 304 stainless steel (line II).

DETAILED DESCRIPTION

The composite of the present invention utilizes nickel or a nickel base alloy as the first component thereof. Any desired nickel base alloy may be employed as the first component. For example, the nickel component may be high purity nickel, commercial purity nickel or a nickel base alloy containing one or more of the following alloying additions: aluminum, cobalt, titanium, iron, copper, manganese, silicon, carbon, sulfur or chromium. For example, nickel alloys 200, 201 and 270 are particularly suitable for this application. Other representative nickel alloys include, but are not limited to nickel alloys 205, 220, 230 and the nickel-copper alloys, such as nickel alloy 400 and 502, etc.

The second component of the present invention is a copper base alloy containing either iron in an amount from 0.5 to 5.0% and preferably from 1 to 3.5%, or cobalt in an amount from 0.5 to 2.0%. The copper component may desirably contain additional additives. For example, the copper component may contain phosphorus in an amount from 0.01 to 0.5%, aluminum from 0.01 to 10%, tin from 0.01 to 8%, zinc from 0.01 to 40%, silicon from 0.01 to 0.5%, and from 0.01 to 0.5% of one or more of manganese, nickel, cadium, calcium, titanium, chromium, tungsten or vanadium. It is particularly preferred to utilize one or more of phosphorus, aluminum, zinc, tin, silicon and manganese in an amount from 0.1 to 0.5%.

Naturally, the copper component may include conventional impurities, for example, lead up to 0.3% max., and up to 0.10% total others.

The composite of the present invention is predominately copper base alloy, with the copper alloy or second component comprising from 70 to 95% of the area of the composite. If desired, the copper alloy second component may be utilized as the core with the first or nickel component being clad on both sides thereof.

The composite of the present invention has a variety of applications. For example, in view of the magnetic and electrical properties of the nickel and copper components, one may utilize the composite as composite coinage. Alternatively, one may employ the composite as electrical connectors generally or in applications where oxidation resistance is required, for example, in high temperature strip conductors, fin stock or switch components. The composite may also find application in the electronic industry as lead frame and header material or as composite strip or wire with high conductivity and superior welding characteristics. It may also be used in decorative and architectural applications or as high thermal conductivity reflector sheet.

As indicated hereinabove, the composite of the present invention is particularly useful as composite strip or wire in view of its good galvanic compatibility with aluminum. The composite wire preferably has a diameter of from 0.002 to 0.375 inch and the strip or wire is particularly useful in an electrical terminal assembly coupled to an aluminum or copper wire.

In accordance with the present invention, the composite thereof may be prepared by any desired process. For example, the components may simply be rolled together to form a composite strip, such as by the procedure of U.S. Pat. Nos. 3,381,364 and 3,634,926. Alternatively, the components may be explosively bonded together or metallurgically bonded by rolling and heating or heating alone. Alternatively, in the case of wire a nickel clad copper rod may be prepared in accordance with the process described in U.S. Pat. No. 3,509,617. This process forms an assembly by placing the core inside the cladding and reducing the assembly diameter from 10 to 70% by rotary swaging. The metallurgically bonded rod may then be drawn to any desirable wire gage by any method. For example, redraw rod having a diameter of from one-half to three-eighths inch may be readily formed and drawn down to B and S wire gages and down to magnet wire. In the instant specification, unless otherwise stated, all ranges of components are by cross-sectional area.

Naturally, any other desirable method may be employed in forming the composites of the present invention.

The present invention will be more readily understood from a consideration of the following illustrative examples.

EXAMPLE I

A composite material was prepared with a first component or nickel 200 clad on copper alloy 194 having the following composition: iron 2.3%, phosphorus 0.3%, zinc 0.12%, balance essentially copper. The composition of the nickel 200 was as follows: 99.5% nickel, 0.08% carbon max., 0.18% manganese max., 0.2% iron max., 0.005% sulfur max., 0.18% silicon max., and 0.13% copper max. The nickel component was clad on both sides of the copper component, with the copper component comprising 90% of the composite and the nickel component being 5% of the composite on one side of the copper component and 5% of the component on the other side. The composite was prepared by rolling the components together at a reduction of about 65%. After the components were rolled together and metallurgically bonded, the metallurgically bonded composite was cold rolled to final thickness 0.029 inch.

EXAMPLE II

Stainless steel No. 304 is widely used on fasteners and fittings in association with aluminum to restrict galvanic corrosion. Accordingly, for comparative purposes bright annealed stainless steel No. 304 having a gage of 0.020 inch was prepared to simulate a terminal system consisting of a copper alloy core clad with stainless steel. The stainless steel 304 had the following composition: 0.033% carbon, 1.64% manganese, 0.60% silicon, 0.03% phosphorus, 0.01% sulfur, 18.3% chromium, 9.59% nickel, balance iron. The nickel clad alloy 194 prepared in Example I and the type 304 stainless steel material were sheared into strips ½ inch × 4 inches long and crimped around a sample of electrical conductivity grade aluminum wire having a diameter 0.080 inch in order to simulate a terminal assembly. The resultant assemblies were then exposed to a high temperature (100°F) high humidity (100% relative humidity) environment up to 3 months. Samples were periodically removed for visual inspection of corrosion and determination of the weight loss of the aluminum wire. The stainless steel type 304 — electrical conductivity grade aluminum assembly began to show signs of aluminum corrosion after two weeks. After sixty days, such large amounts of corrosion products had accumulated on this assembly that complete electrical conductivity had been lost.

On the other hand, the nickel clad alloy 194 —electrical conductivity grade aluminum assembly did not show signs of corrosion until 30 days exposure. After 60 days exposure, significantly less corrosion on this assembly had occurred than on the stainless steel assembly. In addition, insufficient corrosion products had accumulated on the assembly of the present invention to cause loss of the electrical conductivity grade aluminum wire in each terminal assembly as a function of time is shown in the FIGURE which forms a part of the present specification. In the FIGURE the electrical conductivity grade aluminum coupled to the composite of the present invention is shown as line I and the electrical conductivity grade aluminum coupled to 304 stainless steel is shown as line II. It can be clearly seen that even after longer exposure times the aluminum wire coupled to the composite of the present invention has corroded substantially less than the aluminum wire coupled to the stainless steel. Furthermore, no delamination or corrosion of the composite interface between the nickel and the alloy 194 was noted.

In neither case discussed in this example was any corrosion observed or either the nickel or the type 304 stainless steel indicating that in the galvanic cell generated in the simulated terminal assemblies these materials were being cathodically protected by the aluminum.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composite having a first component of nickel or a nickel base alloy and a second component of a copper alloy consisting essentially of a material selected from the group consisting of iron from 0.5 to 5.0%, cobalt from 0.3 to 2.0% and mixtures thereof, balance copper.

2. A composite according to claim 1 wherein the copper component includes from 0.01 to 0.5% of a material selected from the group consisting of phosphorus, aluminum, zinc, tin, silicon, manganese and mixtures thereof.

3. A composite according to claim 1 wherein the copper alloy second component is the core and is clad on both sides with said first component.

4. A composite according to claim 1 wherein the second component represents from 70 to 95% of the area of the composite.

5. A composite strip or wire having good galvanic compatibility with aluminum including a first component of nickel or a nickel base alloy and a second component of a copper alloy consisting essentially of a material selected from the group consisting of iron from 0.5 to 5.0%, cobalt from 0.3 to 2.0% and mixtures thereof, balance copper.

6. A composite according to claim 5 wherein the copper component includes from 0.01 to 0.5% of a material selected from the group consisting of phosphorus, aluminum, zinc, tin, silicon, manganese and mixtures thereof.

7. A composite wire according to claim 5 having a diameter of from 0.002 to 0.375 inch.

8. A composite according to claim 5 wherein the second component represents from 70 to 95% of the area of the composite.

9. An electrical terminal having high strength, good corrosion resistance and good galvanic compatibility including an aluminum or copper wire coupled to a composite having a first component of nickel or a nickel base alloy and a second component of a copper alloy consisting essentially of a material selected from the group consisting of iron from 0.5 to 5.0%, cobalt from 0.3 to 2.0% and mixtures thereof, 0.1 to 0.5% of a material selected from the group consisting of phosphorus, aluminum, zinc, tin, silicon, manganese and mixtures thereof, balance copper.

* * * * *